April 26, 1960     H. C. MILLER ET AL     2,933,798

TAPERED LINE

Filed Sept. 22, 1955

INVENTOR.
HARRY C. MILLER
FRANCIS J. GREGORY
BY

ATTORNEY

United States Patent Office 2,933,798
Patented Apr. 26, 1960

2,933,798
TAPERED LINE

Harry C. Miller, Pleasantville, N.Y., and Francis J. Gregory, Tolland, Conn., assignors to The Kingfisher-Bristol Company, a corporation of Connecticut Application September 22, 1955, Serial No. 535,811

5 Claims. (Cl. 28—81)

This invention relates to a novel means of joining or uniting line.

An object of the invention is to provide a substantially invisible union or splice for braided line and particularly to unite lines of unequal diameter to provide a tapered line formed from level line.

The novel features which are believed to be characteristic of the invention are set forth with particularity in the appended claims. The invention itself, however, both as to its organization and method of operation may best be understood by reference to the following description taken in conjunction with the accompanying drawings, in which:

Figure 1:
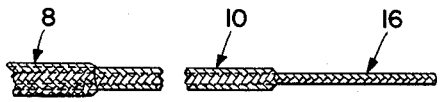
Fig. 1 illustrates a union of three level lines of different diameter forming a resultant tapered line.

In Fig. 1 there is shown a portion of a tapered line formed by the level lines 8, 10 and 16. The union of level lines of graded diameter provides a resultant tapered line. Tapered line is normally made by stopping a braider at regular intervals and adding or subtracting filaments. This, of course, greatly reduces the line output of the braider. This invention eliminates this and accordingly reduces the manufacturing cost of tapered line.

Figure 3:
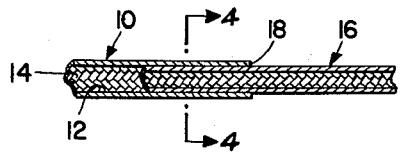
Fig. 3 is an enlarged sectional view of one of the unions in Fig. 1.

The tapered line of Fig. 1 is formed by joining the level lines 8, 10 and 16 in the manner illustrated in Fig. 3 where the coreless braided line 10 has an internal wall 12 formed of the braided strands 14. The braided line 16 is shown inserted in the coreless center of the line 10 and in contact with the walls thereof. Since it is an inherent characteristic of braided line to decrease in diameter under tension, the inner wall 12 of the line 10 will constrict and grip the line 16 to form a secure union of the lines 10 and 16. The greater the tensile force applied against this union the tighter will be the grip of line 10 on line 16. With a sixteen carrier coreless braided nylon fishing line we have found that this union is stronger than the line itself.

Figure 2:
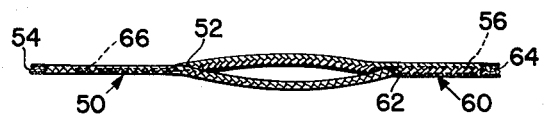
Fig. 2 illustrates a modified union of two lines.

With reference to Fig. 2, the line 50 may be joined to the line 60 by a double insertion. As shown in Fig. 2, the free end 56 of the line 50 is inserted through the side wall 62 of the line 60 and into the hollow cavity 64. The free end 66 of the line 60 may be passed through the wall 52 of the line 50 and into the hollow interior 54. In this manner, there is provided a protected strong double splice. It should be borne in mind that a splice of the type shown in Fig. 2 may be made, as shown, of lines 50 and 60 of unequal diameter since it is possible to place a larger line into the core of a smaller braided line. This is because when a braided line is compressed linearly it expands in diameter. That is to say, that the reverse of the action providing the gripping constriction will permit the smaller line 50 to receive into its core the larger line 60. As shown in the drawings, the line 60 has a larger diameter than the line 50.

Figure 4:
Fig. 4 is a sectional view on line 4—4 of Fig. 3 with an exaggerated showing of an impregnated coating or bond.

The union of some line may be opened by applying a stripping action or force to the end 18 of the line 10 provided the lines are not under tension. Where this can occur, we have found that impregnating the union with a plastic cement will prevent such separation. Specifically, in the case of a braided nylon line, the union may be immersed in an impregnating bath of liquid nylon, i.e. nylon dissolved in a volatile solvent. After the solvent volatizes, the union cannot be separated by a stripping action or motion. As shown in Fig. 4, the line 10 will be bonded at 11 to the line 16.

It is thus obvious that line made of any of the synthetic fibers may be impregnated and bonded by passing through a bath containing the particular synthetic dissolved in a volatile solvent. It is also possible with natural fibers to use lacquers and drying oils. However, we have found the bonding is not necessary in the case of tapered fishing line made from nylon or platyl.

It is an embodiment of the invention to form a bight in the end of a line and insert the end through the side wall of the standing portion of the line to form a union of the type shown at 62, 64 (Fig. 2). This provides a permanent end loop.

We claim:

1. A braided plastic tapered line comprising, several sections of level line of progressively varying diameter, said sections being braided coreless line having hollow centers, said sections being joined by insertion of an end portion of a section into the hollow center of the end portion of an adjoining section to form a progressively tapered line.

2. A tapered line substantially as set forth in claim 1 and further characterized in that said adjacent sections are joined by the insertion of a portion of a section of larger diameter into the core of a section of smaller diameter.

3. The method of forming a tapered line by joining more than two portions of braided plastic lines of different diameter comprising joining said portions end to end by inserting an end of each of said portions into a joining portion of different diameter, then impregnating the adjacent braids of said joined portions with a plastic solution to form a tapered line.

4. A synthetic tapered line formed of three or more sections of coreless level synthetic line of progressively varying diameter, each section being joined to its adjacent section by insertion of an end of one section into the hollow core of the adjacent section and dispersed particles of the synthetic material of which said line is formed being positioned about said inserted portion of said section and within the core of said adjacent hollow section.

5. A tapered nylon line formed of three or more sections of coreless nylon level line, said sections each having a different diameter from each other section and being arranged progressively according to diameter size, said sections being joined to each other by insertion of an end of one section into the hollow core of the adjacent section, and adherent nylon particles positioned about the inserted end of a section and within the core of the adjacent hollow section.

References Cited in the file of this patent

UNITED STATES PATENTS

| | | |
|---|---|---|
| 338,216 | Atwood | Mar. 16, 1886 |
| 772,338 | Chandler | Oct. 18, 1904 |
| 1,441,476 | Baker | Jan. 9, 1923 |

(Other references on following page)

UNITED STATES PATENTS

| | | | |
|---|---|---|---|
| 1,967,102 | Schlegel | July 17, | 1934 |
| 2,000,832 | Fisher | May 7, | 1935 |
| 2,257,953 | Hashkell | Oct. 7, | 1941 |
| 2,320,088 | Leekley | May 25, | 1943 |
| 2,407,929 | Jeckel | Sept. 17, | 1946 |
| 2,508,521 | Lay | May 23, | 1950 |
| 2,533,418 | Benoit | Dec. 12, | 1950 |
| 2,700,317 | Lilienfeld | Jan. 25, | 1955 |
| 2,702,983 | Mische | Mar. 1, | 1955 |
| 2,705,862 | Steiger et al. | Apr. 12, | 1955 |

FOREIGN PATENTS

| | | | |
|---|---|---|---|
| 14,380 | Great Britain | | 1909 |
| 430,023 | France | Aug. 1, | 1911 |